US005677815A

United States Patent [19]
Chan

[11] Patent Number: 5,677,815
[45] Date of Patent: Oct. 14, 1997

[54] SUPPORT ARM FOR USE IN AN ACTUATOR ASSEMBLY OF A DIGITAL STORAGE SYSTEM WITH THE SUPPORT ARM BEING FORMED FROM A POLYMER AND INCLUDING A GROUNDING CONDUCTOR

[76] Inventor: Hon Po Chan, Room 4-6, 12/F., Blk. B, Vigor Industrial Building, 14-20 Cheung Tat Road, Tsing Yi, N.T., Kowloon, Hong Kong

[21] Appl. No.: 549,433

[22] Filed: Oct. 27, 1995

[51] Int. Cl.$^6$ ............................................. G11B 5/55
[52] U.S. Cl. ............................................. 360/106; 360/104
[58] Field of Search ............................. 360/97.01–98.01, 360/104–106, 108

[56] References Cited

U.S. PATENT DOCUMENTS

| | | | |
|---|---|---|---|
| 4,611,257 | 9/1986 | Shiroyama et al. | 360/104 |
| 4,760,478 | 7/1988 | Pal et al. | 360/104 |
| 4,796,122 | 1/1989 | Levy et al. | 360/98.01 |
| 4,845,579 | 7/1989 | Wilkinson, Jr. | 360/106 |
| 4,933,791 | 6/1990 | Cheng | 360/104 |
| 4,949,194 | 8/1990 | MacPherson et al. | 360/104 |
| 5,006,946 | 4/1991 | Matsuzaki | 360/104 |
| 5,014,145 | 5/1991 | Hosokawa et al. | 360/104 |
| 5,055,969 | 10/1991 | Putnam | 360/106 |
| 5,095,396 | 3/1992 | Putnam et al. | 360/106 |
| 5,121,273 | 6/1992 | Slezak | 360/104 |
| 5,140,482 | 8/1992 | Kimura et al. | 360/104 |
| 5,245,489 | 9/1993 | Kimura et al. | 360/104 |
| 5,251,085 | 10/1993 | Morris et al. | 360/106 |
| 5,260,847 | 11/1993 | Basehore et al. | 360/106 |
| 5,282,103 | 1/1994 | Hatch et al. | 360/104 |
| 5,303,100 | 4/1994 | Nakayama et al. | 360/104 |
| 5,311,384 | 5/1994 | Johnson | 360/104 |
| 5,321,568 | 6/1994 | Hatam-Tabrizi | 360/104 |
| 5,382,851 | 1/1995 | Loubier | 310/13 |
| 5,396,390 | 3/1995 | Arakawa et al. | 360/123 |
| 5,408,372 | 4/1995 | Karam, II | 360/104 |
| 5,440,437 | 8/1995 | Sanada et al. | 360/104 |

*Primary Examiner*—Jefferson Evans
*Attorney, Agent, or Firm*—Timothy T. Tyson; Ted Masters

[57] ABSTRACT

A support arm (30) for use in an actuator assembly (500) of a digital storage system is fabricated from a polymer such as polyphenylene sulfide (PPS) and is integrally molded with the hub section (502) of the actuator assembly (500). A conductor (36) is embedded within the support arm (30). Support arm (30) may be tapered or ribbed to provide greater rigidity and stiffness. A plurality of lead wire-retaining hooks (41) are molded along the edge of support arm (30) to facilitate lead wire (510) routing and result in less lead wire breakage.

11 Claims, 4 Drawing Sheets

SUPPORT ARM FOR USE IN AN ACTUATOR ASSEMBLY OF A DIGITAL STORAGE SYSTEM WITH THE SUPPORT ARM BEING FORMED FROM A POLYMER AND INCLUDING A GROUNDING CONDUCTOR

TECHNICAL FIELD

The present invention pertains to digital storage systems such as magnetic disk drives, and more particularly to a support arm for carrying the suspension and attached read/write head.

BACKGROUND ART

Digital storage devices have been known in the art for many years. One well known category of storage device is the magnetic hard disk drive, wherein the storage device includes a stack of rigid disks coated with a magnetic material and rotatably mounted on a spindle. An actuator assembly selectively carries read/write transducer heads across the surface of the disks to the desired information track. The read/write heads are positioned in very close proximity to the surface of the disks, riding upon an air bearing created by the rapid rotation of the disk. Through accompanying electronic circuitry, the read/write heads are used to read digital information from the disks and to write digital information to the disks. For example, U.S. Pat. No. 4,760,478 shows a visco-elastically damped magnetic head suspension assembly for a disk file. A magnetic head support arm comprises a relatively rigid arm structure and a magnetic head suspension assembly fixed at one end to the head support arm having means on the other end to support a transducer head, and having a tapered elongated flat load beam connecting the ends. U.S. Pat. No. 4,796,122 defines an integral head positioner for a Winchester type hard disk storage system. The head positioner includes a main rotating metal body portion having outwardly extending, integral, head positioning arms. In order to reduce vibration and increase positioning accuracy, the arms extend outwardly from the central axis of rotation for a distance which is substantially greater than the additional outward extent of the springy load beams upon which the magnetic heads are supported. U.S. Pat. No. 4,933,791 depicts a head arm flexure for disc drives. An improved flexure for a disc drive having a rotary head positioning apparatus located within a housing for locating a plurality of magnetic read/write heads relative to the recording media. U.S. Pat. No. 4,949,194 discloses a ceramic support arm for movably positioning transducers. The support arm is adapted for high-speed positioning of a transducer such as a read/write head in a magnetic disk drive. The support arm is essentially composed of a ceramic material having a high specific stiffness. U.S. Pat. No. 5,006,946 comprises a flexible polymeric resinous magnetic head supporting device. The device includes a supporter having a resilient spring portion and a rigid beam portion contiguous to the resilient spring portion; a flexible member composed of a plate of a polymeric resinous material having conductors for wiring; and, a magnetic head having a slider. U.S. Pat. No. 5,014,145 consists of a head arm structure mounting a circuit element in a magnetic disc device. The system includes data head arms for supporting a data head, support head arms for supporting a support head, and a head actuator for rigidly moving the data and servo head arms as a unitary structure. U.S. Pat. No. 5,055,969 describes a servo/data actuator arm flexible circuit. The improved multilayer flexible circuit for use in a disk storage device actuator arm supporting a data head and a servo head includes a first ground plane and a second electrically floating ground plane. U.S. Pat. No. 5,121,273 includes a computer disk head interconnect assembly. The apparatus consists of a read/write head mounted onto a positioning device along with several electrical leads that extend from the read/write head to an interconnect pad mounted on the positioning device. U.S. Pat. Nos. 5,140,482 and 5,245,489 show a guide arm with an affixed printed circuit board for a magnetic disk drive. The device comprises a guide arm disposed between a magnetic head and an actuator so as to transmit actuating force of the actuator to the magnetic head thereby guiding the magnetic head along a plane of a magnetic disk, a printed circuit to the guide arm, and a deflection compensating member for making the coefficients of thermal expansion of the guide arm and the printed circuit substantially equal to each other in at least the direction of seek of the head arm. U.S. Pat. No. 5,251,085 defines a pivotable arm assembly with reduced thermal distortion. The assembly has substantially reduced misregistration due to thermal effects, and includes an anti-friction material positioned between the smooth sleeve and the smooth bore. U.S. Pat. No. 5,260,847 depicts a sleeveless rotatable beryllium/aluminum actuator arm for a magnetic disc drive. The rotable actuator includes a suspension attached to a first end of the arm, a transducer attached to the suspension, and a voice coil attached to a second end of the arm. U.S. Pat. No. 5,282,103 discloses a magnetic head suspension assembly fabricated with integral load beam and flexure. The device includes a load beam section, a flexure section, a rear mount section and a leaf spring section between the load beam and the rear mount. U.S. Pat. No. 5,303,100 comprises a magnetic disk device with a floating-type magnetic head for use with a disk-shaped recording medium having a sliding area for the floating-type magnetic head formed outside a recording area. The length in the disk radial direction of a suspension supporting the floating-type magnetic head is varied depending on individual magnetic disk devices. U.S. Pat. No. 5,311,384 consists of a wire tubing catching member integral with a gimbal. A gimbal tubing capture supports a conductor sleeve as part of a head-gimbal assembly. The gimbal tubing capture includes a capture member extending outward from a side edge of the gimbal. U.S. Pat. No. 5,321,568 describes a head suspension assembly with improved pitch and roll characteristics. A rotary actuated arm assembly for positioning a transducer over a data track of a rotating magnetic disk includes a flexure attached to a load beam at one end and to a slider at the other end. U.S. Pat. No. 5,440,437 includes a magnetic head arm having a thermal compensating member for correcting track error. An arm included in the head is partly constituted by a member which is different in the coefficient of thermal expansion from the other portion of the arm.

DISCLOSURE OF INVENTION

The present invention is directed to an improved support arm for use in an actuator assembly of a digital storage system such as a magnetic hard disk drive. The actuator assembly comprises a rotatable unit having a hub section pivotally connected to a central bearing. A coil positioning section, which is used to rotate the actuator assembly about the central bearing, is integral with one side of the hub section. Generally, opposite the coil positioning section, and also integral with the hub section, are a plurality of stacked support arms in predetermined spaced relationship. The support arms carry resilient suspensions or flexures which in turn carry read/write heads. The support arms disclosed herein are unique in that they are molded from a non-conductive polymer, such as by injection molding, and are integral with the hub section of the actuator assembly. This is in sharp contrast to the conventional metallic support arm construction wherein the support arms are machined. Since the support arms are fabricated from inexpensive non-conductive polymer, and in that the read/write heads must still be electrically grounded, a conductor, running the length of the actuator arm, is embedded within the polymer, or in other words the polymer overmolds the conductor.

The use of a non-conductive polymer with an embedded conductor delivers many advantages to both the fabrication and operation of the support arm. The stacked support arms, and the integral actuator hub section, can be produced in a single injection molding step which requires no expensive machining. The conductor can be stamped rather than machined, and since it is embedded in the polymer, most deburring is eliminated. The polymer is lighter than aluminum, and therefore the moment of inertia of the actuator assembly is reduced with a corresponding reduction in settling and access times. Additionally, the lighter design will permit the use of smaller positioning coils, thereby also reducing the consumption of energy and generation of unwanted heat. The support arms may be molded in a variety of structural shapes, such as tapered and ribbed, to increase stiffness and reduce the amplitude of support arm, and thereby read/write head, vibrations. Since the stacked support arms and integral hub section are molded from a dimensionally stable polymer, the need for expensive after-production mechanical adjustments or "tweaking" is essentially eliminated. The polymer may be selected with an extremely low thermal conductivity as compared to aluminum or other metals. This translates into less thermal distortion, thereby reducing or eliminating track misalignment. Lead wire grooves can be molded along the edge of the support arm, thereby eliminating the necessity of machining these features as in the conventional design. In a novel embodiment, a plurality of lead wire-retaining hooks are molded along the edge of the support arm. These lead wire-retaining hooks facilitate lead wire routing, and result in less lead wire breakage during that operation. Also, the lead wire-retaining hooks can accommodate a variety of wire sizes. Finally, the embedded conductor can also be selected so as to provide added structural strength and stiffness in addition to providing an electrical ground.

In accordance with a preferred embodiment of the invention, the support arm is fabricated from a polymer such as polyphenylene sulfide (PPS) and is integrally molded with the hub section of the actuator arm. A grounding means is connected to the support arm.

In accordance with an important feature of the invention, the grounding means includes a conductor which is longitudinally disposed along the support arm, and is preferably embedded within the polymer.

In accordance with an important aspect of the invention, the conductor includes a metal or otherwise electrically conductive frame having at least one mold enhancing hole and a grounding hole at a first end, and a swaging hole at a second end.

In accordance with another important feature of the invention, the conductor includes a metal or otherwise electrically conductive strip.

In accordance with another important aspect of the invention, the conductor includes a wire connected between a grounding eyelet and a swaging eyelet.

In accordance with another important feature of the invention, the support arm is tapered to provide greater rigidity and stiffness.

In accordance with another important aspect of the invention, the support arm has structure-enhancing longitudinal ribs.

In accordance with a preferred embodiment, the support arm includes a plurality of lead wire-retaining hooks longitudinally disposed along at least one edge. Other features and advantages of the present invention will become apparent from the following detailed description, taken in conjunction with the accompanying drawings, which illustrate, by way of example, the principles of the invention.

MODES FOR CARRYING OUT THE INVENTION

Figure 1:
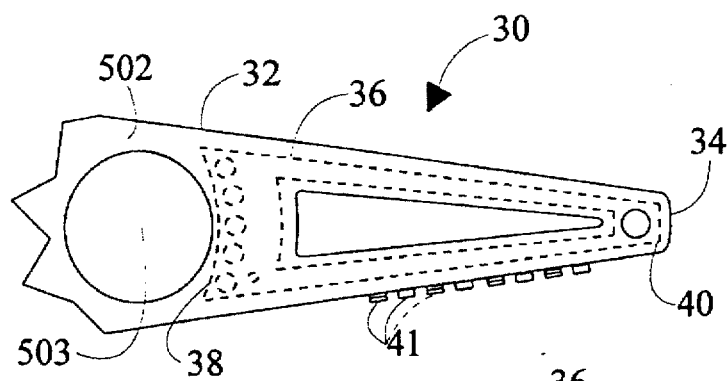
FIG. 1 is a top view of a support arm in accordance with the present invention, wherein a conductor is embedded within the support arm.

Referring initially to FIG. 1, there is illustrated a top view of a support arm in accordance with the present invention, generally designated as 30. Support arm 30 is used in the actuator assembly 500 of a digital storage device (refer to FIG. 13) which includes a pivoting hub section 502 having a bearing hole 503. Support arm 30 has a first end 32 and an opposite second end 34, and is fabricated from a polymer. In a preferred embodiment, the polymer is polyphenylene sulfide resin (PPS), which is sold under the trade name Ryton™ R-4 02 by the Phillips 66 Company, Phillips Engineering Plastics, P.O. Box 7777, Bartlesville, Okla. 74005-777. PPS has a longstanding reputation as a high performance engineering thermoplastic for use in injection molding applications. PPS has high dimensional stability, and may be molded to extremely close tolerances thereby requiring no secondary finishing. Further, PPS can withstand temperatures of 125° C. with very little outgassing, warping or deformation. While PPS is preferred, other polymers such as PPA (polyphthalamide) or PC (polycarbonate) could be utilized. These polymers may be used with or without fiber additives.

Hub section 502 of actuator assembly 500 is fabricated from the same polymer as support arm 30. First end 32 of support arm 30 is integral with hub section 502, support arm 30 being a molded extension of hub section 502. A grounding means is connected to support arm 30. In the embodiment shown, the grounding means includes a conductor 36 in the form of an electrically conductive frame which is longitudinally disposed along support arm 30. Conductor 36 has a first end 38 adjacent to first end 32 of support arm 30, and a second end 40 adjacent to second end 34 of support arm 30. In the preferred embodiment shown, conductor 36 is embedded within support arm 30, or in other words, the polymer of support arm 30 overmolds conductor 36. While overmolding is preferred, conductor 36 could also be disposed along the outside of support arm 30. Support arm 30 also includes a plurality of lead wire-retaining hooks 41 longitudinally disposed along at least one edge.

Figure 2:
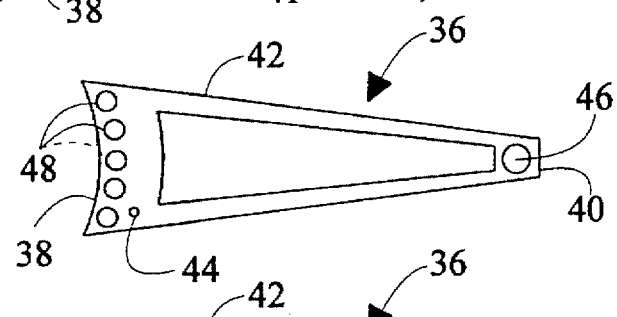
FIG. 2 is a top view of the conductor portion of the support arm.

FIG. 2 is a top view of conductor 36. Conductor 36 includes an electrically conductive frame 42 having a ground hole 44 located near first end 38, and a swaging hole 46 located near second end 40. Ground hole 44 accepts a grounding pin (not shown) which electrically connects the conductors 36 of a set of stacked support arms 30 (refer to FIG. 13). Swaging hole 46 is used to connect a suspension or flexure 504 (refer to FIG. 16). In a preferred embodiment, electrically conductive frame 42 is fabricated from a metal such as aluminum or magnesium, however other metals, alloys, or conductive non-metals could also be utilized. Conductor 36 further includes at least one mold-enhancing hole 48 which provides better polymer to conductor 36 coalescence during the molding process.

Figure 3:
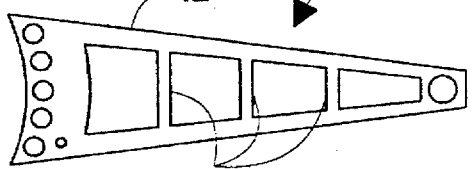
FIG. 3 is a top view of a second conductor embodiment.
Figure 4:
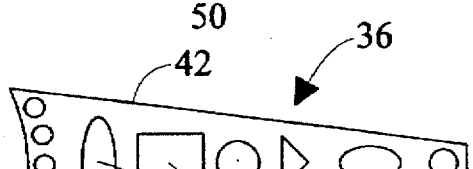
FIG. 4 is a top view of a third conductor embodiment.

FIGS. 3 and 4 are top views of second and third conductor 36 embodiments respectively. In FIG. 3 a plurality of cross-bracing members 50 have been added to frame 42, and in FIG. 4 a plurality of cutouts 52 have been included. Cutouts 52 may be shaped and positioned so as to balance actuator assembly 500 (refer to FIG. 13), particularly so with respect to coil positioning section 506.

Figure 5:
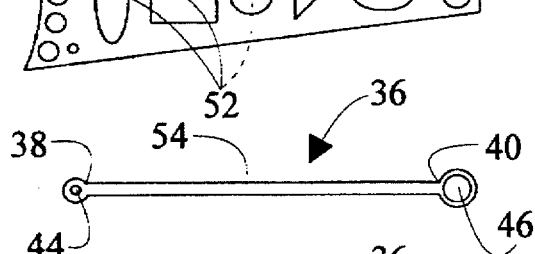
FIG. 5 is a top view of a fourth conductor embodiment.

FIG. 5 is a top view of a fourth conductor 36 embodiment. Conductor 36 includes an electrically conductive strip 54 having a grounding hole 44 near first end 38, and a swaging hole 46 near second end 40.

Figure 6:
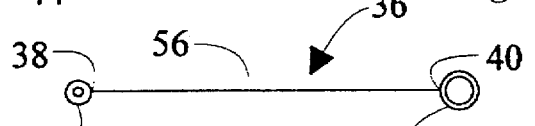
FIG. 6 is a top view of a fifth conductor embodiment.

FIG. 6 is a top view of a fifth conductor 36 embodiment. Conductor 36 includes a metal wire 56 connected between a grounding eyelet 58 located at first end 38, and a swaging eyelet 60 located at second end 40. Wire 56 could be fabricated from any metal. If structural strength is desired, spring or stainless steel could be utilized.

Figure 7:
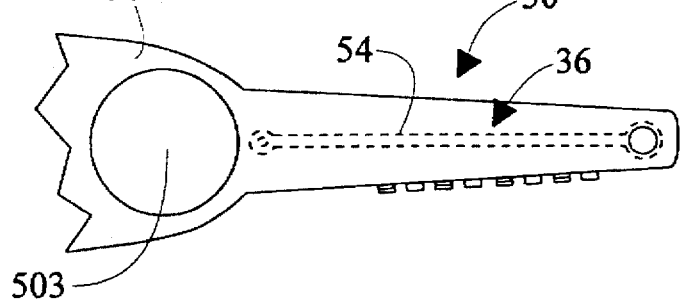
FIG. 7 is a top view of a second support arm embodiment.

FIG. 7 is a top view of a second support arm 30 embodiment, wherein conductor 36 includes an electrically conductive strip 54.

Figure 8:
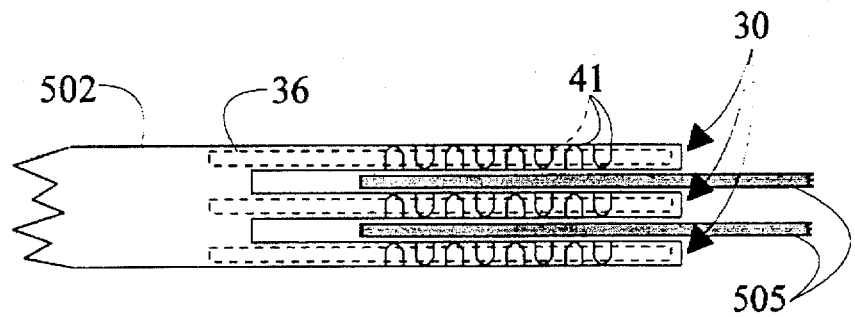
FIG. 8 is a side view of a plurality of stacked support arms.

FIG. 8 is a side view of a plurality of stacked support arms 30. In the figure, three stacked support arms 30 are illustrated, however it may be appreciated that there could be a greater or lesser number. Support arms 30 are stacked in a predetermined spaced relationship, each support arm 30 connected to and integral with hub section 502 of actuator assembly 500 (refer to FIG. 13). The predetermined spaced relationship is selected so that a magnetic disk 505 may be accepted in the space between to adjacent support arms 30. Support arms 30 include embedded connector 36, and a plurality of lead wire-retaining hooks 41.

Figure 9:
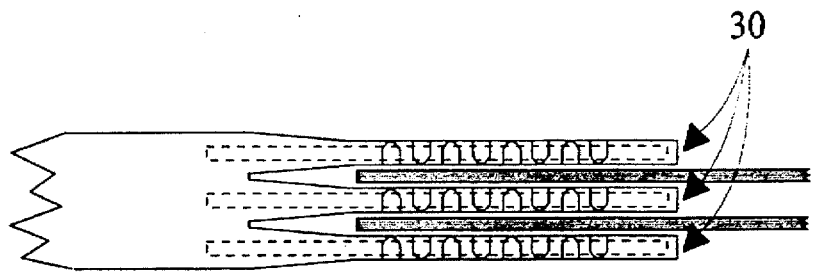
FIG. 9 is a side view of a second embodiment of stacked support arms.
Figure 10:
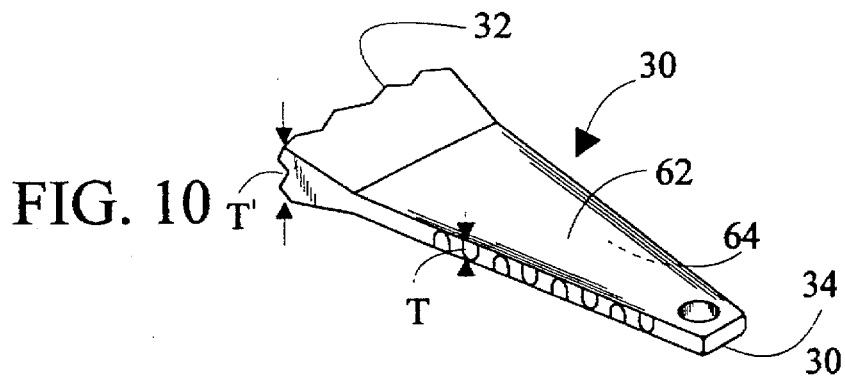
FIG. 10 is a fragmented perspective view of a tapered support arm.

FIG. 9 is a side view of a second embodiment of stacked support arms 30, and FIG. 10 is a fragmented perspective view of a tapered support arm 30. Support arm 30 has a first surface 62 and an opposite second surface 64 defining a variable thickness T therebetween. Thickness T being greatest T' at first end 32 thereby defining a taper in the direction of second end 34. It is noted that the taper concludes just prior to reaching magnetic disk 505, and that support arm 30 is straight from that point to end 34.

Figure 11:
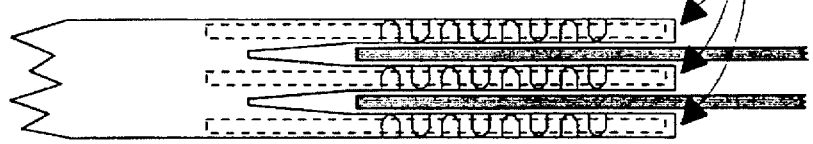
FIG. 11 is a side view of a third embodiment of stacked support arms.
Figure 12:
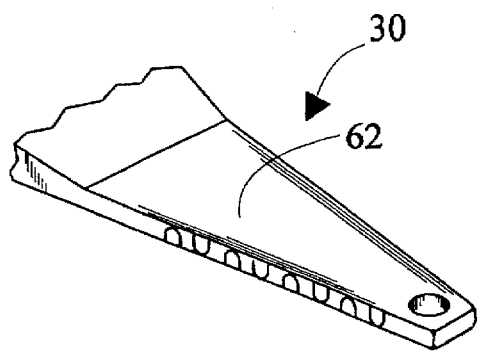
FIG. 12 is a fragmented perspective view of a second tapered embodiment.

FIG. 11 is a side view of a third embodiment of stacked support arms 30, and FIG. 12 is a fragmented perspective view of a second tapered embodiment. In this embodiment only one surface 62 of support arm 30 is tapered, such as is the case for the outer two support arms 30.

Figure 13:
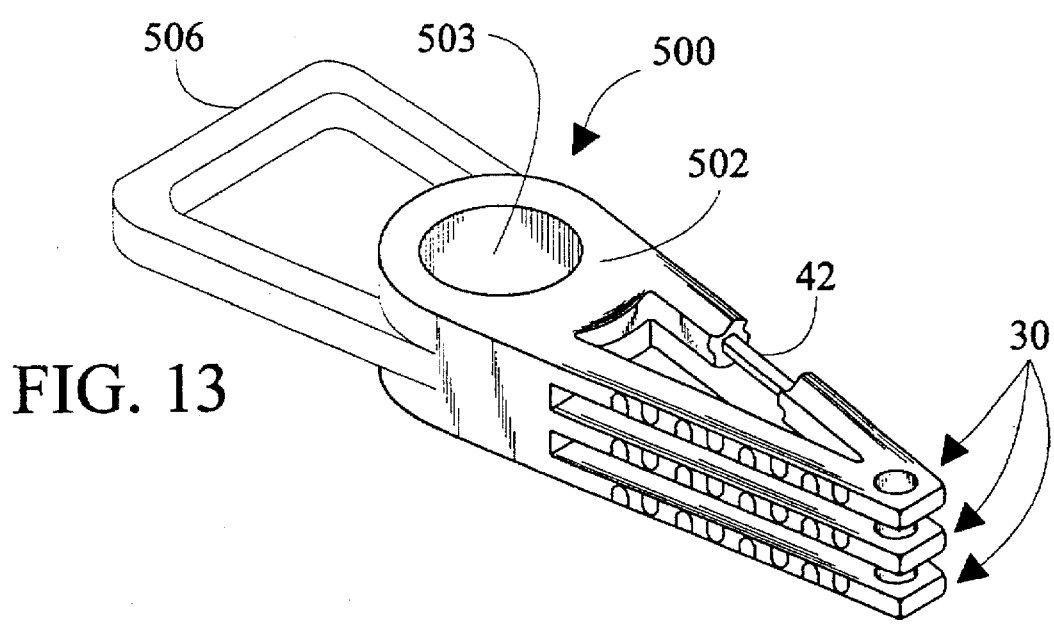
FIG. 13 is a perspective view of an actuator assembly showing a plurality of stacked support arms.

FIG. 13 is a perspective view of an actuator assembly 500 showing a plurality of stacked support arms 30. Support arms 30 are integral with hub section 502. Coil positioning section 506 is located generally opposite support arms 30. Electrically conductive frame 42 is shown in the cut away view.

Figure 14:
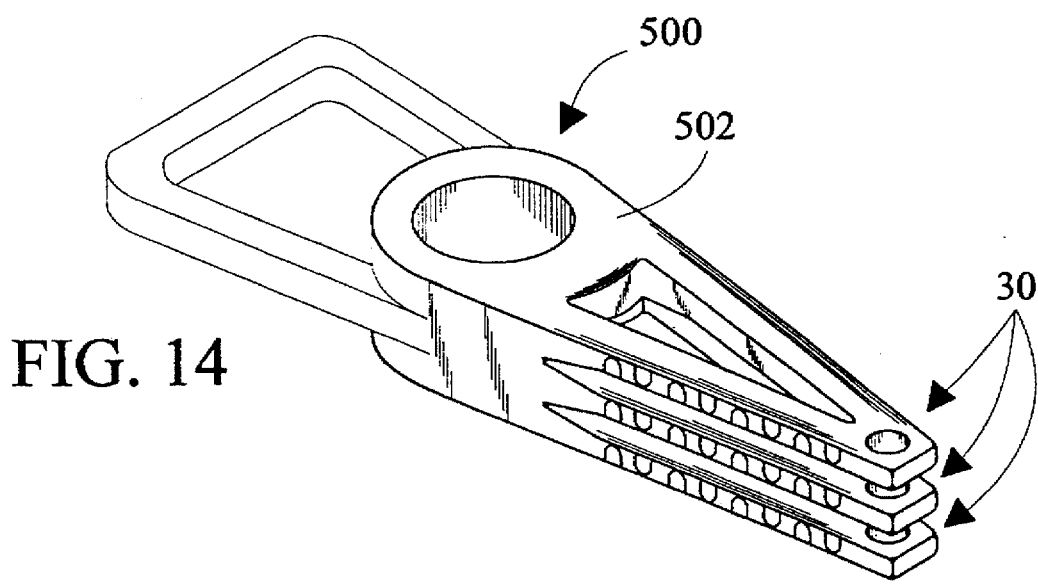
FIG. 14 is a perspective view of an actuator assembly showing a plurality of stacked and tapered support arms.

FIG. 14 is a perspective view of an actuator assembly 500 showing a plurality of stacked and tapered support arms 30.

Figure 15:
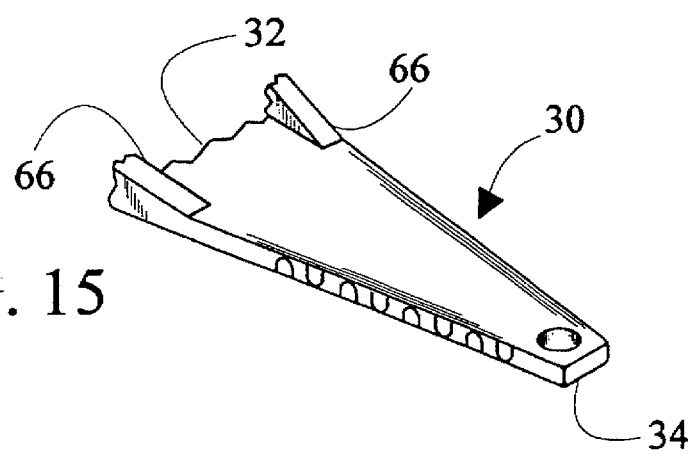
FIG. 15 is a fragmented perspective view of a support arm 30 having structural ribs

FIG. 15 is a fragmented perspective view of a support arm 30 having structural ribs 66. Ribs 66 longitudinally emanate from first end 32 in the direction of second end 34. Ribs 66 are tapered similarly to the tapered configuration of FIG. 10, or alternatively could be straight having no taper.

Figure 16:
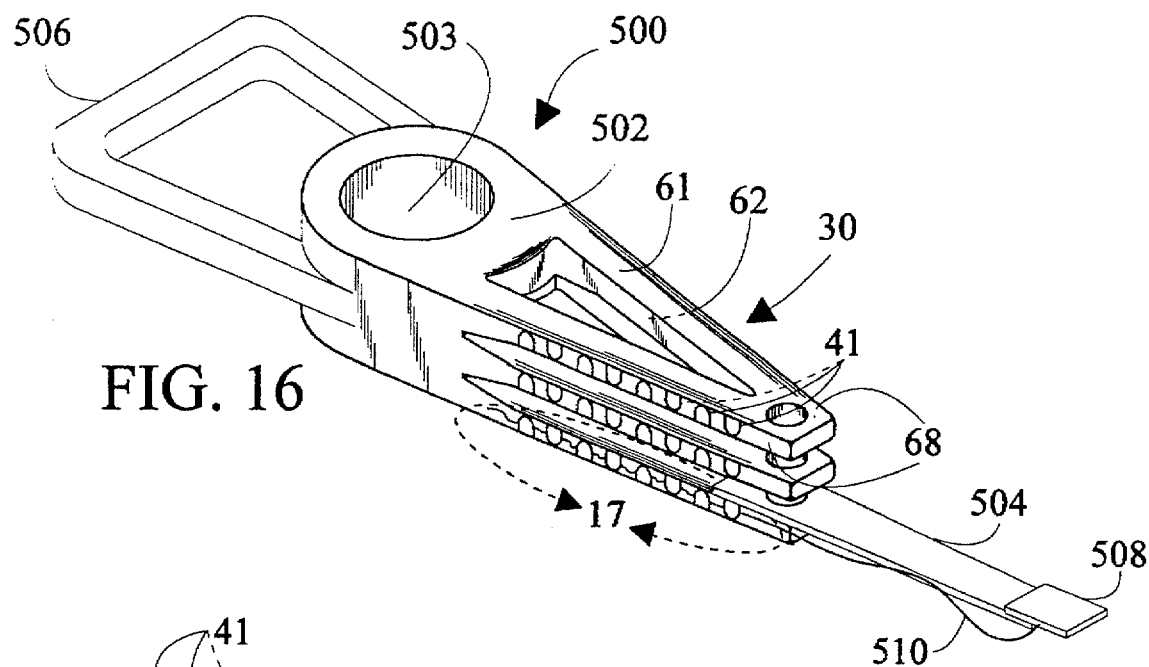
FIG. 16 is a perspective view of an actuator assembly showing a plurality of stacked support arms having a plurality of lead wire-retaining hooks.
Figure 17:
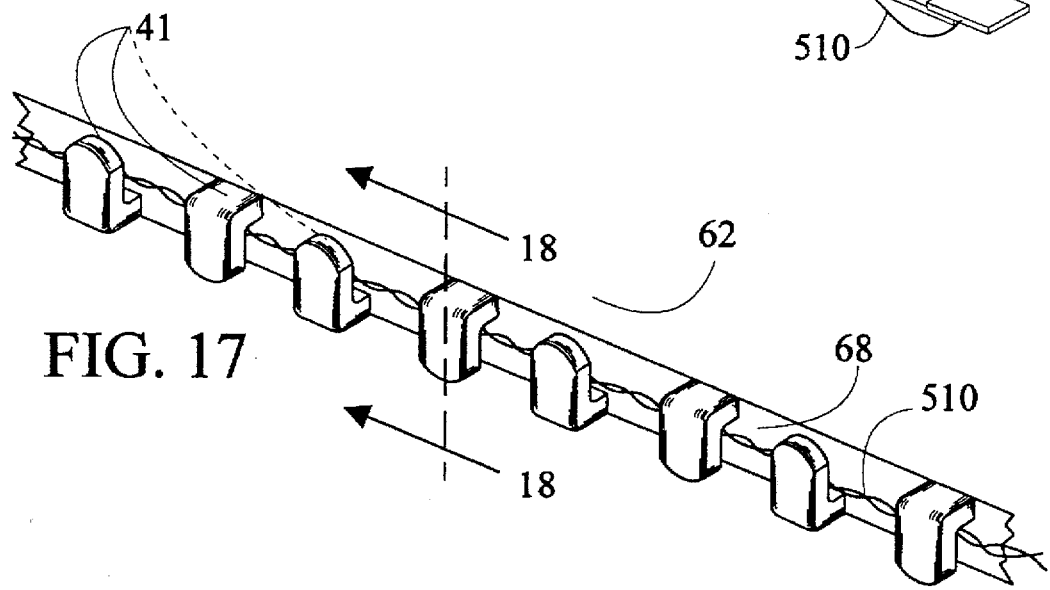
FIG. 17 is an enlarged perspective view of the area 17 of FIG. 16.

FIG. 16 is a perspective view of an actuator assembly 500 showing a plurality of stacked support arms 30 having a plurality of lead wire-retaining hooks 41, and FIG. 17 is an enlarged perspective view of the lead wire-retaining hooks 41. Actuator assembly 500 includes coil positioning section 506, bearing hole 503, hub section 502, suspension or flexure 504, and read/write head 508. Support arm 30 includes a first surface 62 and an opposite second surface 64 and two edge portions 68 therebetween. A plurality of lead wire-retaining hooks 41 are longitudinally disposed along at least one edge portion 68. The hooks 41 alternate orientation, wherein adjacent hooks open in opposite directions. Lead wires 510 emanate from read/write head 508 and are laced through the plurality of lead wire-retaining hooks 41. The lead wires 510 are retained in position through the captive action of the alternately oriented lead-wire retaining hooks 41.

Figure 18A:
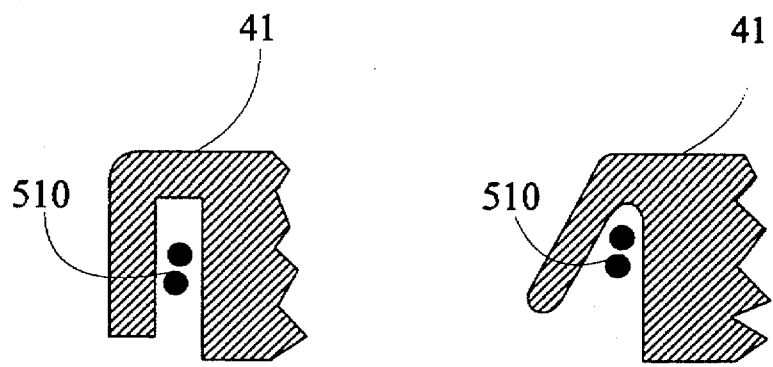
FIG. 18A is an enlarged cross sectional view of a lead wire-retaining hook along the line 18—18 of FIG. 17; and, FIG. 18B is an enlarged cross sectional view of a second embodiment of a lead wire-retaining hook along the line 18—18 of FIG. 17.

FIG. 18A is an enlarged cross sectional view of a lead wire-retaining hook along the line 18—18 of FIG. 17.

Figure 18B:
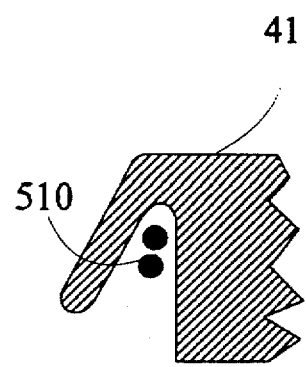

FIG. 18B is an enlarged cross sectional view of a second embodiment of a lead wire-retaining hook along the line 18—18 of FIG. 17.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A support arm for use in an actuator assembly of a digital storage system, the actuator assembly including a pivoting hub section, comprising:

said support arm having a first end and an opposite second end;

said support arm fabricated from a non-conductive polymer;

the hub section also fabricated from said polymer, said first end of said support arm being integral with the hub section; and, a grounding means connected to said support arm, said grounding means including a conductor longitudinally disposed along said support arm, said conductor having a first end adjacent to said first end of said support arm, and a second end adjacent to said second end of said support arm.

2. A support arm in accordance with claim 1, said support arm having ribs longitudinally emanating from said first end in the direction of said second end.

3. A support arm in accordance with claim 1, said support arm having a first surface and an opposite second surface, said surfaces defining a thickness therebetween.

4. A support arm in accordance with claim 3, said thickness being greatest at said first end.

5. A support arm for use in an actuator assembly of a digital storage system, the actuator assembly including a pivoting hub section, comprising:

said support arm having a first end and an opposite second end;

said support arm fabricated from a polymer;

the hub section also fabricated from said polymer, said first end of said support arm being integral with the hub section;

a grounding means connected to said support arm;

said grounding means including a conductor longitudinally disposed along said support arm, said conductor having a first end adjacent to said first end of said support arm, and a second end adjacent to said second end of said support arm; and, said conductor embedded within said support arm.

6. A support arm in accordance with claim 5, wherein said polymer overmolds said conductor.

7. A support arm in accordance with claim 5, wherein said conductor includes a metal wire connected between a grounding eyelet located at said first end of said conductor, and a swaging eyelet located at said second end of said conductor.

8. A support arm in accordance with claim 5, wherein said conductor includes an electrically conductive strip having a grounding hole located near said first end of said conductor, and a swaging hole located near said second end of said conductor.

9. A support arm in accordance with claim 5, wherein said conductor includes an electrically conductive frame having a ground hole located near said first end of said conductor, and a swaging hole located near said second end of said conductor.

10. A support arm in accordance with claim 9, wherein said frame includes at least one mold enhancing hole located near said first end of said conductor.

11. A support arm for use in an actuator assembly of a digital storage system, the actuator assembly including a pivoting hub section, comprising:

said support arm having a first end and an opposite second end;

said support arm fabricated from a polymer;

the hub section also fabricated from said polymer, said first end of said support arm being integral with the hub section;

a grounding means connected to said support arm;

said polymer selected from the group consisting of polyphenylene sulfide, polyphthalamide, and polycarbonate;

said grounding means including a conductor longitudinally disposed along said support arm;

said polymer overmolding said conductor;

said support arm having a first surface and an opposite second surface, said surfaces defining a thickness therebetween, said thickness being greatest at said first end; and, a plurality of lead wire-retaining hooks disposed along said support arm.

* * * * *